W. E. CRIST.
GATE VALVE.
APPLICATION FILED JULY 25, 1910.
1,005,165.
Patented Oct. 10, 1911.
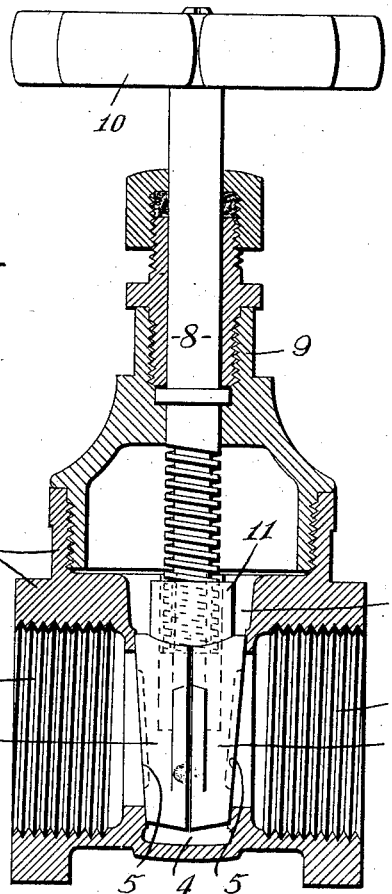
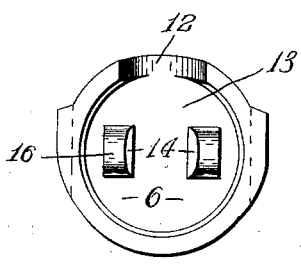 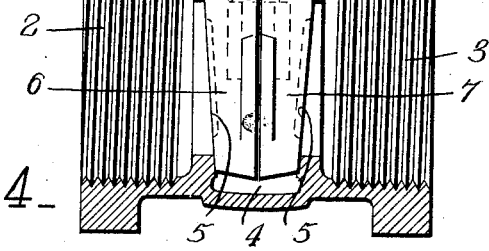 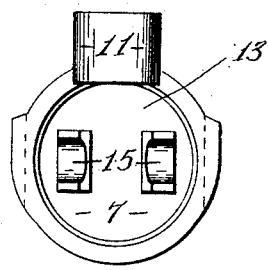
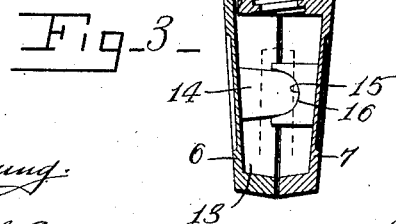
WITNESSES:
Chas H. Young
T. Davis
INVENTOR
William Edward Crist
BY
Parsons Hall & Bodell
ATTORNEYS

UNITED STATES PATENT OFFICE.

WILLIAM EDWARD CRIST, OF SYRACUSE, NEW YORK, ASSIGNOR TO OLIVER M. EDWARDS, OF SYRACUSE, NEW YORK.

GATE-VALVE.

1,005,165.  Specification of Letters Patent.  Patented Oct. 10, 1911.

Application filed July 25, 1910. Serial No. 573,660.

*To all whom it may concern:*

Be it known that I, WILLIAM EDWARD CRIST, of Syracuse, in the county of Onondaga and State of New York, have invented a certain new and useful Gate-Valve, of which the following is a specification.

This invention has for its object the production of a particularly simple and efficient gate valve, and it consists in the combinations and constructions hereinafter set forth and claimed.

In describing this invention, reference is had to the accompanying drawing in which like characters designate corresponding parts in all the views.

Figure 1 is a longitudinal sectional view, partly in elevation, of a valve embodying my invention. Figs. 2 and 3 are, respectively, transverse and longitudinal sectional views of the detached valve disks. Figs. 4 and 5 are inner face views of said valve disks.

1 is the valve casing formed with inlet and outlet couplings 2 and 3, and a substantially central valve chamber 4 having annular walls or valve seats 5 converging downwardly toward each other.

6 and 7 are valve disks movable in the chamber 4, and engaging the seats 5 thereof, one disk as 6, being supported entirely by the other disk 7, and the disk 7 being connected to a threaded operating stem or spindle 8 extending upwardly through a housing 9 mounted on the top of the casing 1, the spindle 8 having a handle 10 at its upper end. As here shown the disk 7 is formed with an internally threaded collar 11 extending substantially radially relatively to the axial line of the disks 6 and 7 and receiving the stem or spindle 8, a part of such collar projecting beyond the plane of the side of the disk 7 opposed to the disk 6; and the disk 6 is formed with a semi-circular cutout 12 complemental to, and loosely fitting, the projecting part of the threaded collar 11.

The disks 6 and 7 are formed with recesses 13 in their opposing sides, and the disk 6 is connected to the disk 7 by means of bearing studs 14 arranged on opposite sides of the axial line of the threaded collar 11, and projecting from the bottom of the recess 13 in the disk 6 beyond said recess; and bearing sockets 15 which receive the ends of the studs 14 and are usually provided on the ends of studs projecting from the bottom of the recess in the disk 7. Preferably, each of the studs 14 has its free end formed with surfaces 16, Fig. 3, diverging in opposite directions from substantially the center thereof toward the base of the stud in a plane parallel to the axial line of the collar 11, portions of said surfaces 16 at the free extremities of the studs 14 converging toward the bases of these studs from inner sides of said studs 14 to outer sides thereof in a plane at substantially right angles to said axial line, as seen in Fig. 2; and the bearing sockets 15 have surfaces complemental to the opposing surfaces of the extremities of the studs 14 received in said sockets. The surfaces 16 of the ends of the studs 14 and the complemental surfaces of the sockets 15 formed as described, permit a limited pivotal movement of the disks 6, 7 in directions at right angles to each other, and prevent lateral displacement of the disks relatively to each other.

What I claim, is:—

1. In a gate valve, a pair of opposing valve disks, one being provided with an engaging part, and one of the disks being provided with bearing studs on opposite sides of the axial line of said engaging part, each of the studs having its free end formed with surfaces diverging in opposite directions from substantially the center thereof toward the base of the stud in a plane parallel to said axial line, portions of said surfaces at the free extremities of the studs converging toward the bases of the studs from inner parts of the studs toward outer sides thereof in a plane disposed at substantially right angles to said axial line, and the other disk being provided with bearing sockets for coacting with the free ends of the studs, said sockets having surfaces complemental to the opposing surfaces of the studs, and operating means including a stem coacting with said engaging part, substantially as and for the purpose set forth.

2. In a gate valve, a pair of opposing valve disks, one being supported entirely by the other, and the supporting disk being provided with a threaded part, one of the disks being provided with bearing studs on opposite sides of the axial line of said threaded part, each of the studs having its free end formed with surfaces diverging in opposite directions from substantially the center thereof toward the base of the stud in a plane parallel to said axial line, portions of said surfaces at the free extremities of the studs converging toward the bases of the studs from inner parts of the studs toward outer sides thereof in a plane disposed at substantially right angles to said axial line, and the other disk being provided with bearing sockets for coacting with the free ends of the studs, said sockets having surfaces complemental to the opposing surfaces of the studs, and operating means including a threaded stem coacting with said threaded part, substantially as and for the purpose described.

3. In a gate valve, a pair of opposing valve disks, one being provided with an engaging part, the disks being formed with recesses in their opposing sides, and one of the disks being provided with bearing studs arranged on opposite sides of the axial line of said engaging part and projecting from the interior of the recess in such disk beyond said recess, each of the studs having its free end formed with surfaces diverging in opposite directions from substantially the center thereof toward the base of the stud in a plane parallel to said axial line, portions of said surfaces at the free extremities of the studs converging toward the bases of the studs from inner parts of the studs toward outer sides thereof in a plane disposed at substantially right angles to said axial line, and the other disk being provided with bearing sockets located in its recess and coacting with the free ends of the studs, said sockets having surfaces complemental to the opposing surfaces of the studs, and operating means including a stem coacting with said engaging part, substantially as and for the purpose specified.

4. In a gate valve, a pair of opposing valve disks, one being supported entirely by the other, and the supporting disk being provided with a threaded part, the disks being formed with recesses in their opposing sides, and each of the disks being provided with bearing means supported within its recess and coöperating with the bearing means of the other disk, the bearing means of one disk having surfaces diverging in one plane toward the bottom of the recess and converging toward said bottom in a plane at right angles to the first-mentioned plane, and the bearing means of the other disk having surfaces complemental to the companion bearing means of the opposing disk, and operating means including a threaded stem coacting with said threaded part, substantially as and for the purpose set forth.

5. In a gate valve, a pair of opposing valve disks, one being supported entirely by the other, and the supporting disk being provided with a threaded part, the disks being formed with recesses in their opposing sides, and one of the disks being provided with bearing studs arranged on opposite sides of the axial line of said threaded part and projecting from the bottom of the recess in such disk beyond said recess, each of the studs having its free end formed with surfaces diverging in opposite directions from substantially the center thereof toward the base of the stud in a plane parallel to said axial line, portions of said surfaces at the free extremities of the studs converging toward the bases of the studs from inner parts of the studs toward outer sides thereof in a plane disposed at substantially right angles to said axial line, and the other disk being provided with studs projecting from the bottom of its recess and provided at their ends with bearing sockets for coacting with the free ends of the first-mentioned studs, said sockets having surfaces complemental to the opposing surfaces of the first-mentioned studs, and operating means including a threaded stem coacting with said threaded part, substantially as and for the purpose described.

6. In a gate valve, a pair of opposing valve disks, one being formed with an engaging collar having its axis substantially radial relatively to the axial line of the disks, a part of the collar projecting from the contiguous portions of the disk, and the other disk being supported entirely by the disk provided with the collar and being formed with a cutout complemental to the projecting part of the collar for receiving said projecting part, and operating means including a stem coacting with said collar, substantially as and for the purpose specified.

7. In a gate valve, a pair of opposing valve disks, one being formed with an internally threaded collar having its axis substantially radial relatively to the axial line of the disks, a part of the collar projecting from contiguous portions of the disk, and the other disk being supported entirely by the disk provided with the collar and being formed with a cutout complemental to, and loosely fitting, the projecting part of the collar for receiving said projecting part, the disks being formed with recesses in their opposing sides, and one of the disks being provided with bearing studs arranged on opposite sides of the axial line of said collar and projecting from the bottom of the recess in such disk beyond said recess, each of the studs having its free end formed with surfaces diverging in opposite directions from substantially the center thereof toward the base of the stud in a plane parallel to said axial line, portions of said surfaces at the free extremities of the studs converging toward the bases of the studs from inner parts of the studs toward outer sides thereof in a plane disposed at substantially right angles to said axial line, and the other disk being provided with studs projecting from the bottom of its recess and provided at their ends with bearing sockets for coacting with the free ends of the first-mentioned studs, said sockets having surfaces complemental to the opposing surfaces of the first-mentioned studs, and operating means including a threaded stem coacting with the internal threads of the collar, substantially as and for the purpose set forth.

In testimony whereof, I have hereunto signed my name in the presence of two attesting witnesses, at Syracuse, in the county of Onondaga, in the State of New York, this 21st day of July, 1910.

WILLIAM EDWARD CRIST.

Witnesses:
GENEVIEVE B. SMITH,
S. DAVIS.